United States Patent [19]

Ellwood

[11] Patent Number: 4,978,288
[45] Date of Patent: Dec. 18, 1990

[54] APPARATUS FOR USE IN PRODUCING PELLETS
[75] Inventor: Henry Ellwood, Rochdale, England
[73] Assignee: Farrell Limited, Rochdale, United Kingdom
[21] Appl. No.: 365,926
[22] Filed: Jun. 14, 1989
[30] Foreign Application Priority Data
  Jun. 17, 1988 [GB] United Kingdom ............... 8814437
[51] Int. Cl.$^5$ .............................................. B29B 9/06
[52] U.S. Cl. .................................... 425/311; 264/142; 425/313; 425/404; 425/DIG. 230
[58] Field of Search ....... 425/67, 311, 313, DIG. 230, 425/142, 404; 264/142

[56] References Cited
U.S. PATENT DOCUMENTS

| | | | |
|---|---|---|---|
| 3,892,834 | 7/1975 | Pritchard | 264/142 |
| 4,099,900 | 7/1978 | Bradbury et al. | 425/313 |
| 4,260,356 | 4/1981 | Fujiwara et al. | 264/142 |
| 4,401,421 | 8/1983 | Anders | 425/311 |
| 4,410,306 | 10/1983 | Anders et al. | 425/311 |
| 4,671,756 | 6/1987 | Bertolotti | 425/313 |
| 4,710,113 | 12/1987 | Voigt | 425/313 |
| 4,846,644 | 7/1989 | Lin | 264/142 |

FOREIGN PATENT DOCUMENTS

| | | |
|---|---|---|
| 232927 | 8/1987 | European Pat. Off. . |
| 2455757 | 6/1976 | Fed. Rep. of Germany ...... 425/311 |
| 2504445 | 10/1982 | France . |
| 61-185416 | 8/1986 | Japan .................................... 425/311 |
| 1075996 | 7/1967 | United Kingdom . |
| 1456506 | 11/1976 | United Kingdom . |

Primary Examiner—Jay H. Woo
Assistant Examiner—James P. Mackey
Attorney, Agent, or Firm—Parmelee, Bollinger & Bramblett

[57] ABSTRACT

Apparatus for use in producing pellets including a pelletizer having an annular chamber partially defined by a pellet plate against which spring loaded knives are urged. Pellets produced by moving the knives relative to the plate to repeatedly cut plastics extruded through apertures in the plate are carried by a water stream out of the chamber. This stream enters the chamber via an inlet and performs one cycle round the chamber before exiting the chamber with the pellets via exit which is in the same plane as inlet. With this arrangement the axial extent of the pelletizer is reduced and the relatively short travel of the pellets promotes efficiency.

9 Claims, 3 Drawing Sheets

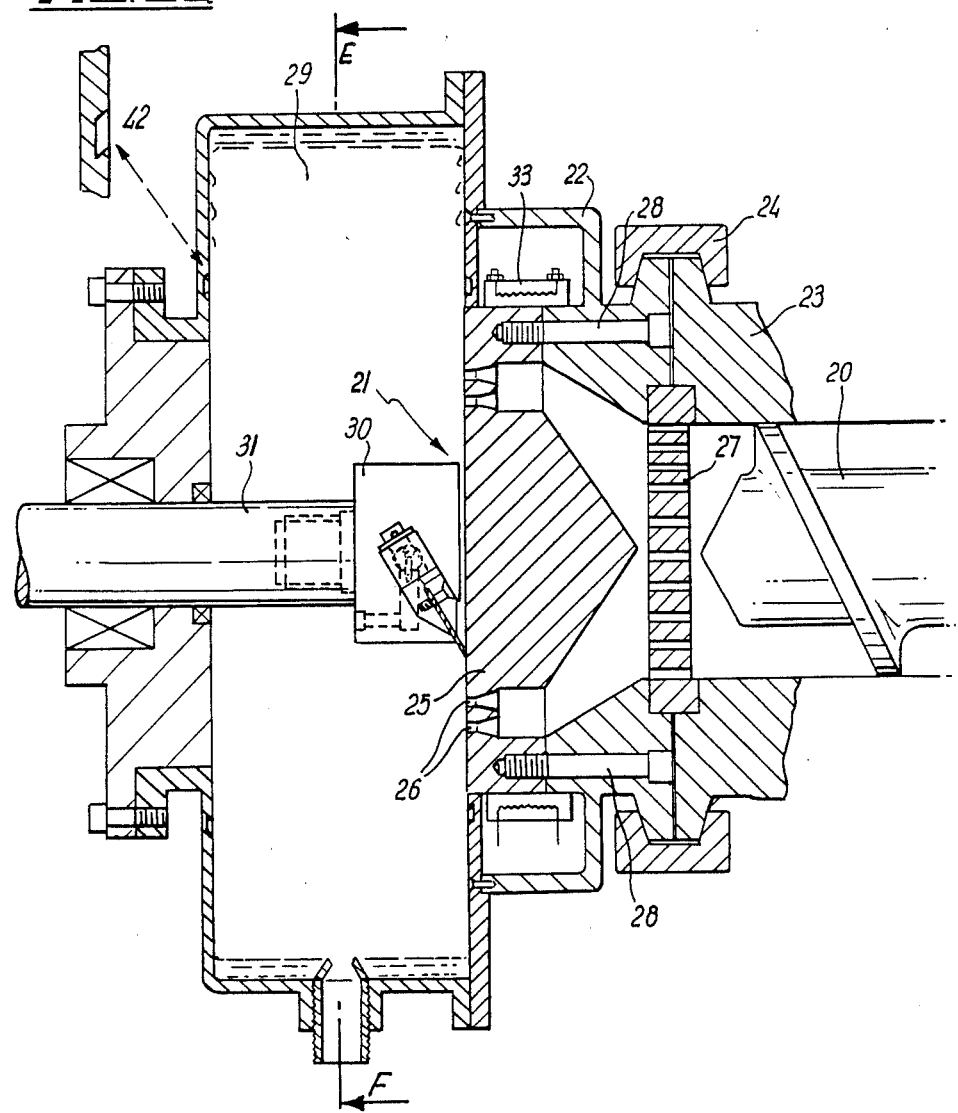

APPARATUS FOR USE IN PRODUCING PELLETS

The present invention relates to apparatus for use in producing pellets of plastics material.

One such already known apparatus is described in U.K. Patent Specification No. 1,075,996. In this arrangement pellets are produced by repetitively passing a blade over a plurality of extrusion holes in a pellet plate. The pellets produced are cooled and carried out of the apparatus by a stream of water following a spiral path. Because of the relatively lengthy spiral path which the water has to follow problems are experienced in injecting the water at sufficient speed to cope with a reasonable weight of pellets. Also, the axial length of the machine is somewhat greater than is desired.

Another apparatus is disclosed in U.K. Patent Specification No. 1,514,160 but in this apparatus pellets are blown away from the blade producing them by a gas blast which may not always be desirable.

According to the present invention, there is provided apparatus for use in producing pellets of plastics material comprising an extrusion chamber, a pellet plate defining a plurality of holes through which material may be extruded from the chamber, blade means mounted for movement relative to the pellet plate for producing in use of the apparatus pellets from material extruded through the holes, a further chamber in which the blade means are disposed, a fluid inlet leading into the further chamber and a fluid outlet leading from the further chamber, the inlet and outlet being in substantially the same plane whereby in use fluid introduced into the inlet may travel round the periphery of the chamber collecting pellets produced by the blade means and carry them out of the further chamber.

In a preferred embodiment of the invention, the fluid inlet extends into the chamber a distance adequate to prevent any interference of the exit flow by the incoming stream. This inlet is shaped to prevent or inhibit any turbulence of the exit stream. With the inlet and outlet being in substantially the same plane, the stream performs substantially only one turn between inlet and outlet. To prevent or inhibit fluid flow across the pellet plate a formation is provided to lead fluid around the plate from above to below. This preferably comprises a groove into which fluid flows and around which it is conducted to exit and rejoin the fluid exit stream. The fluid is preferably water and capilliary action draws the water into the groove.

Cylindrical strands are produced by extrusion through the pellet plate and these strands are repetitively cut by the blade means to produce the cylindrical pellets. The blade means comprise self-adjusting spring loaded knives biased against the pellet plate and angled to direct pellets away from the plate. The exit from the further chamber leads to a flume either straight or curved. This diverges to slow the stream velocity down and deliver it in a controlled manner to a screen where the pellets are separated from the water. The water is returned to a tank from whence it is pumped back to the inlet to the further chamber.

In order that the invention may be more clearly understood, one embodiment thereof will now be described by way of example with reference to the accompanying drawings, in which:

FIG. 2 is a side sectional elevation along the line ABCD of FIG. 3 of part of the apparatus for producing pellets shown in FIG. 1, FIG. 2a shows a view of part of the apparatus of FIG. 2.

Figure 1:
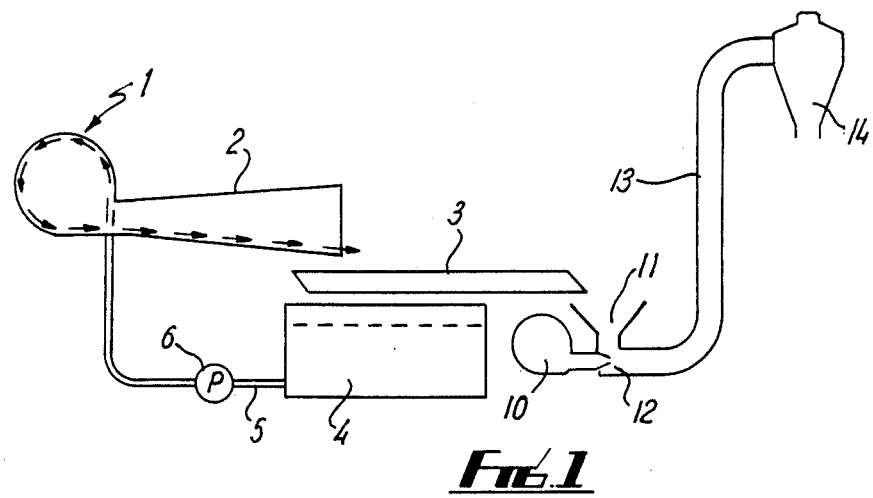
FIG. 1 is a diagrammatic view of apparatus for producing pellets.

Referring to FIG. 1, apparatus for producing pellets comprising a pelletizer 1, a flume 2 leading from the output side of the pelletizer 1, and a screen 3 at the output of the flume. A water tank 4 is disposed directly beneath the screen 3 and an outlet 5 from this tank 4 leads via a water pump 6 to the outlet side of the pelletizer 1. Pellet conveying means are disposed at the end of the screen remote from the flume 2. These comprise a blower fan 10, a pellet inlet 11, a venturi 12 and a pipe 13 leading to a cyclone 14 in which pellets and air may be separated. Briefly, in use, pellets produced by the pelletizer 1 are collected by the stream of water supplied by the pump 6 which exits the pelletizer, complete with pellets, along the flume 2. This then flows over the screen 3. Water passes through the screen into the water tank 4 and pellets exit the screen into the pellet inlet 11 to the venturi 12 there to be carried along to the cyclone 14 where they are separated from the air stream.

The pelletizer itself is similar in many respects to that described in U.K. Patent Specification Nos. 1,456,506 and 1,514,160 and reference is directed to those specifications for description of parts not described in detail herein. Referring to FIG. 2, the pelletizer 1 comprises an extruder screw 20 operative to pump hot plastics material into a pellet head indicated generally by the reference numeral 21. The extruder may be either cold or hot feed. The pellet head 21 is supported on the extruder 20 by means of a head support piece 22 which is fixed to the cylinder 23 of the extruder by means of a 'C' clamp 24. The pellet head 21 comprises a pellet plate 25 which defines a plurality of apertures 26 which in operation produces cylindrical strand extrusions. A breaker plate 27 is disposed at the outlet end of the extruder to support the screen. Bolts 28 connect the plate 25 to the support piece 22. An electrical band heater 33 is disposed around the pellet plate 25.

An annular chamber 29 is located downstream of and is partially defined by the pellet plate 25. In this chamber blade means are disposed. These comprise a knife holder 30 having articulated self adjusting spring loaded knives. The blades which can pivot about two mutually transverse axes are urged against the pellet plate 25. The knife holder is mounted on a drive shaft 31 which can be driven by means of an electric, hydraulic, or mechanical variable speed device (not shown). Relative motion between knives and pellet plate repetitively cuts the cylindrical strand extrusions into a plurality of pellets. The angle of the knives bearing against the pellet plate is such that the pellets produced are directed away from the knives and pellet plate 25.

Figure 4:
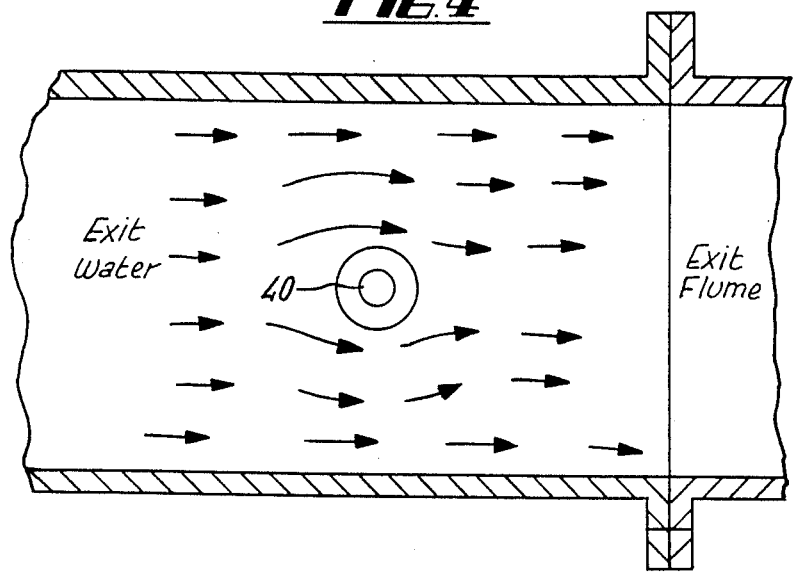
FIG. 4 is a partial plan view in the direction of the arrow Y in FIG. 3.
Figure 3:
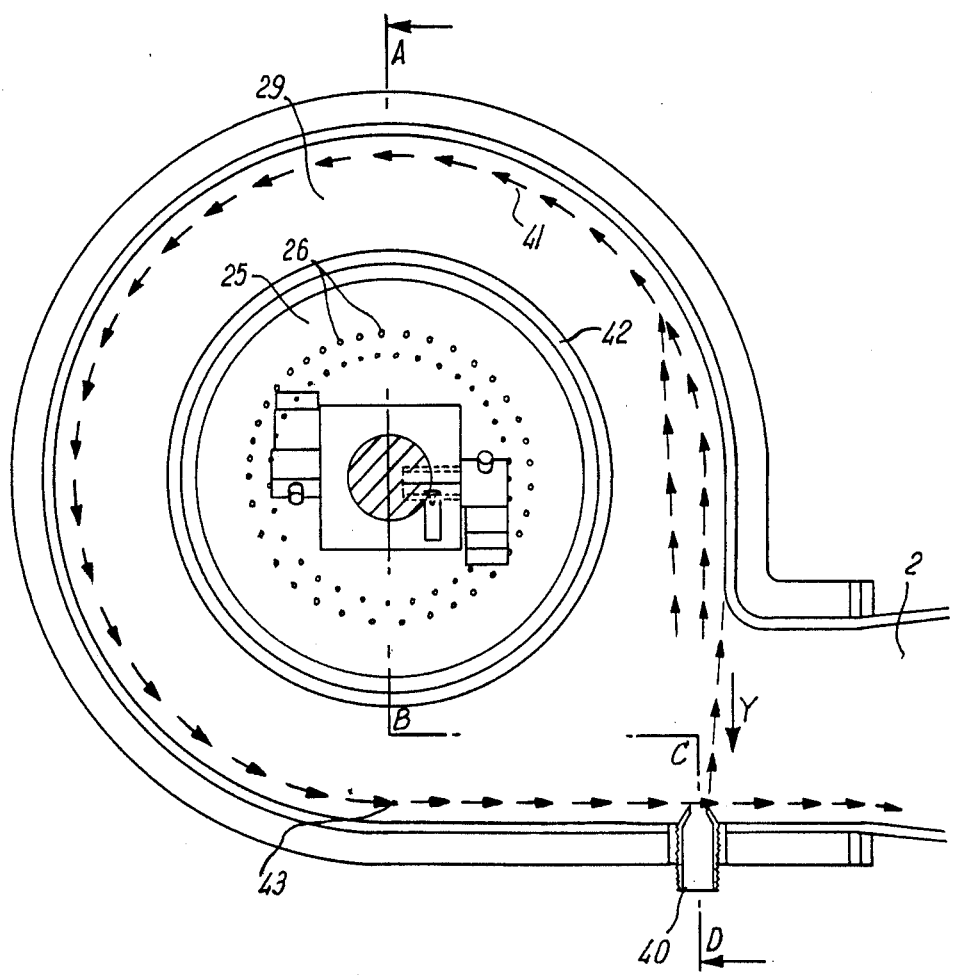
FIG. 3 is a section along the line EF of the apparatus of FIG. 2.

Referring additionally to FIG. 3 a stream of water is, in operation, introduced into the chamber 29 through an inlet 40. This stream follows the substantially circular path 41 shown arrowed in FIG. 3 collecting pellets thrown out from the pellet plate 25 on the way. The pellets are carried forward and cooled by the stream of water which exits into the flume 2 after performing one turn only. The pellets are separated from the water by the screen 3 as described earlier. The inlet 40 is specially shaped to minimize any tendency to turbulent flow as the water flows past it to enter the flume 2. Also the inlet 40 extends a sufficient distance into the chamber 29 to avoid any disturbance in the outlet flow by the incoming water stream itself. The flume progressively diverges to slow down the exit velocity of the water and control its introduction onto the screen 3. The path of the exit water around the inlet 40 is shown in FIG. 4.

Even though the water is travelling quickly around the chamber 29 and is held in position by centrifugal acceleration force, the water in contact with the metal wall defining the chamber periphery is at slow speed and drips or droplets of water can run down the sides of the chamber and onto the pellet plate 25 causing it to cool the plate. A groove 42 is therefore provided to collect the droplets and capilliary attraction leads the water into the groove. The groove is recessed into the plate 25 to inhibit the pellets sticking, as they would if a projecting surface was provided. Water entering the groove 42 at the top runs around the groove and therefore around rather than across the pellet plate and re-enters the pellet plate and re-enters the water stream near to point 43. The form of the groove can be seen in more detail in FIG. 2a.

With this above described arrangement not only is the axial extent of the pellitizer reduced as compared with known arrangements thereby making for a more efficient use of space, the energy removed from the water by the addition of pellets is reduced because of the shorter travel path making it possible to deal with a higher weight of pellets for a given throughput of water.

It will be appreciated that the above embodiment has been described by way of example only and that many variations are possible without departing from the invention. For example, instead of having a straight flume a curved flume can be provided.

I claim:

1. Apparatus for use in producing pellets of plastics material comprising an extrusion chamber having an axis of extrusion, a pellet plate defining a plurality of holes through which material may be extruded from the extrusion chamber, blade means mounted for movement relative to the pellet plate for producing pellets from material extruded through the holes, a further chamber in which the blade means are disposed and having a chamber periphery, a fluid inlet leading into the further chamber and a fluid outlet leading from the further chamber, the fluid inlet and fluid outlet being in substantially the same plane, which plane is substantially traverse to the axis of extrusion, and including means for inhibiting fluid from flowing across the pellet plate, whereby in use fluid introduced into the fluid inlet in an inlet fluid flow travels around the periphery of the further chamber only once collecting pellets produced by the blade means and carries the pellets out of the further chamber in an exit fluid flow.

2. Apparatus as claimed in claim 1, in which the fluid inlet comprises means extending into the further chamber for preventing any interference of the exit fluid flow to the fluid outlet by the fluid flowing into the further chamber from the fluid inlet.

3. Apparatus as claimed in claim 1, in which the fluid inlet comprises means for inhibiting turbulence of the exit fluid flow.

4. Apparatus as claimed in 1, wherein said means for inhibiting fluid from flowing across the pellet plate further comprises means for directing fluid around the pellet plate.

5. Apparatus as claimed in claim 4, in which said fluid directing means comprises a groove into which fluid flows and around which the fluid is conducted to rejoin the exit fluid flow.

6. Apparatus as claimed in claim 1, in which the blade means comprise self-adjusting spring loaded knives biased against the pellet plate and angled to direct pellets away from the plate.

7. Apparatus as claimed in claim 1, in which the fluid outlet from the further chamber leads to a divergent flume which acts to slow down the exit fluid flow and deliver it in controlled manner to a screen where pellets are separated from the fluid.

8. Apparatus as claimed in claim 7, in which the divergent flume is straight.

9. Apparatus as claimed in claim 7 in which the divergent flume is curved.

* * * * *